No. 725,979. PATENTED APR. 21, 1903.
P. J. MENAHAN.
CORSET SHAPER.
APPLICATION FILED APR. 7, 1902.
NO MODEL.
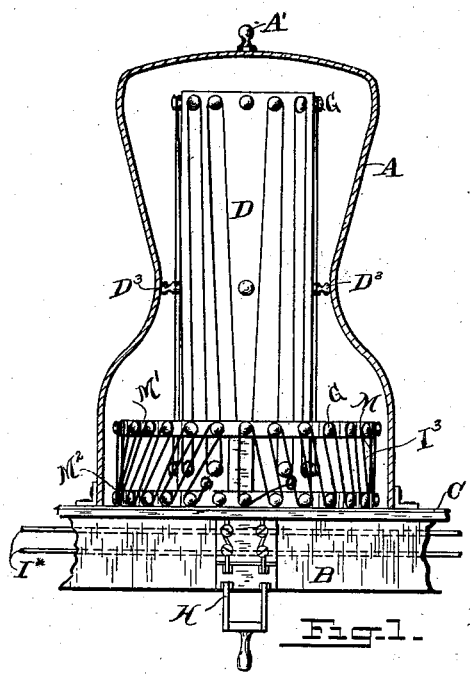
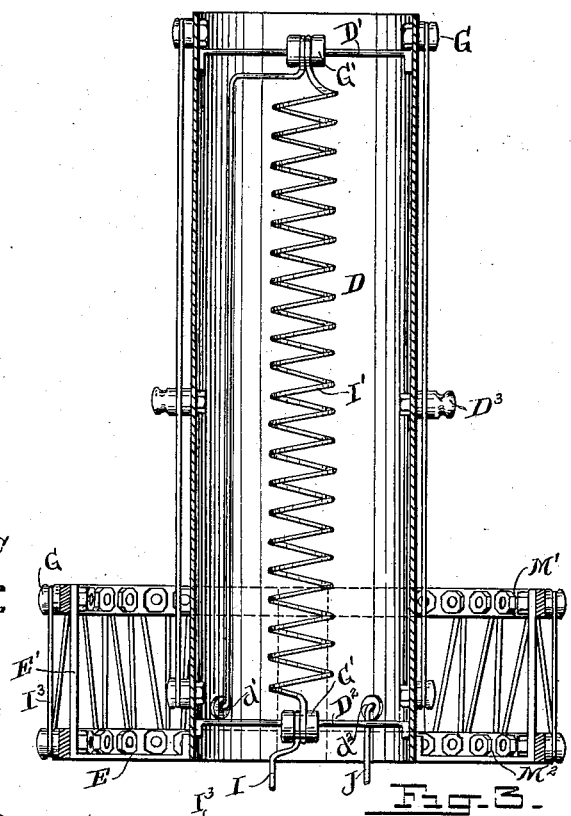
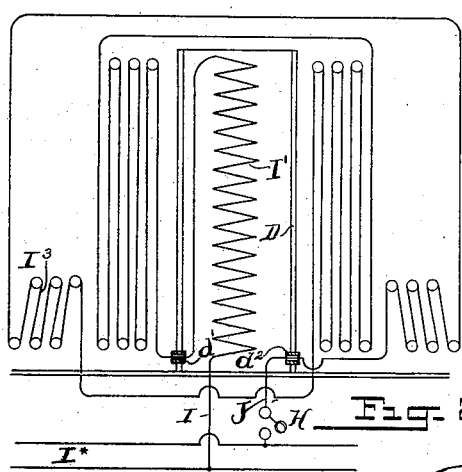
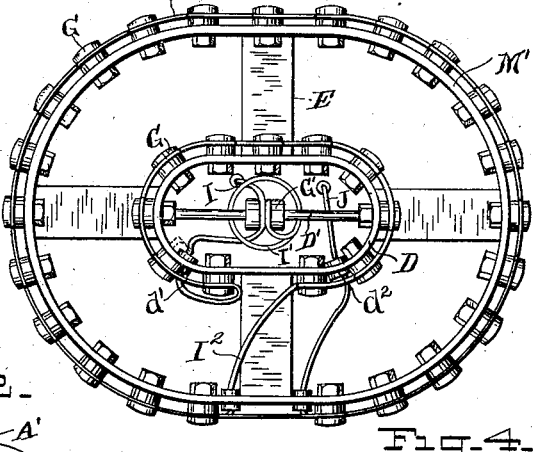
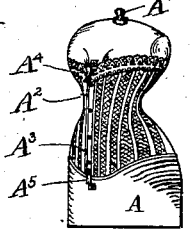
WITNESSES:
INVENTOR.

UNITED STATES PATENT OFFICE.

PATRICK J. MENAHAN, OF BROOKLYN, NEW YORK.

CORSET-SHAPER.

SPECIFICATION forming part of Letters Patent No. 725,979, dated April 21, 1903.

Application filed April 7, 1902. Serial No. 101,649. (No model.)

*To all whom it may concern:*

Be it known that I, PATRICK J. MENAHAN, a citizen of the United States, residing in the borough of Brooklyn, in the city and State of New York, have invented a certain new and useful Improvement in Apparatus for Shaping Corsets, of which the following is a specification.

In the manufacture of corsets after the cutting and sewing has been completed and the springs, eyelets, &c., have been properly introduced there remains a treatment which is commonly known as "shaping," usually effected by dampening the entire corset, extending it on a form having the contour which the finished corset is required to possess and allowing it to dry in that position. The operation may be hastened by the judicious application of heat. It is important that the heat be moderate and uniform.

My invention involves apparatus which allows the general application of heat in liberal quantities, but at only a moderately-high temperature, allows the corset to be easily placed in position on the proper form and easily removed therefrom, and provides for the application of heat through a specially-adapted device which I term a "heating-frame." The frames may be mounted removably in series on a suitable bench or support, and the forms fitted thereon are unloaded and again made to receive a fresh corset in succession. By the time the entire series has been treated the first corset in the series is dry and ready to be removed, and so on indefinitely.

My heating-frame is an electric heat-generator, producing a quick, effective, and cleanly application of heat and inducing a specially perfect condition of the shaped corset generally.

When steam is employed for heating the forms, for some reason, perhaps either on account of leakage, permeation of the pores of the metal, or damp and unclean condition of the operator's hands, due to working around the steam-valves and connections, the surfaces of the form become soiled, requiring their frequent rubbing and cleaning; but even with the best attention experience has demonstrated that a considerable percentage of the goods will become smudged or stained. In practice my invention avoids the difficulties noted and results in an article possessing a high standard of shape and finish.

The following is a description of what I consider the best means of carrying out the invention.

The accompanying drawings form a part of this specification.

Figure 1 is a transverse vertical sectional view of a corset-form containing the novel heating-frame in elevation and illustrating the circuit connections therewith. Fig. 2 is a diagram in elevation illustrating the arrangement of heating-wires with respect to the main circuit and controlling-switch. Fig. 3 is a vertical transverse section of the internal heating-frame, and Fig. 4 is a plan view of the same. Fig. 5 is an elevation showing on a small scale the form provided with means for gaging the position of the adjusted corset and for causing it to more closely conform at certain points to the form.

Similar letters of reference indicate corresponding parts in all the figures where they appear.

A is the hollow shaping-form, which is preferably of metal, as sufficiently thick sheet-copper, possessing the property of heat conductivity. This form having the required graceful contour with a tightly-closed top and a knob A' rests on the supporting bench or table B, an asbestos mat C being interposed to prevent the heat from being undesirably communicated at the base. The form may simply rest on the mat and be independent of the contained heating means, so that it may be lowered into position from above and removed again by a simple lifting movement. I prefer to secure it by screws or analogous fastenings; but such can be easily removed, so that the shaping-form can be conveniently replaced by another of different model whenever required.

The provision for heating is electric, composed of resistance-wires reliably supported with insulation and properly connected to a dynamo or other source of current shaped to nearly fill the bottom and the mid-height of the shaping-form and to also extend up to the top; but this upward extension must not be larger than the interior space in the waist of the form. I will term the whole the "heating-frame." As made it comprises, first, a light vertical structure D, having approximately the cross-section of the waist of the shaping-form A, but a little smaller, and a larger base M, each with suitable wiring. The body portion D is presented by a vertical pipe oval in cross-section. Externally secured at the lower end of this pipe are L-shaped bracket-arms E, which, with the pipe D, are designed to rest on the mat C. To the vertical portions E' of the arms are secured lower and upper oval bands, as will presently appear. An annular series of insulators G are fixed on these bands, as indicated most clearly in Fig. 1. On the exterior of the pipe D are also an upper and lower series of insulators, similarly lettered. Braces D' and $D^2$ span the interior of the pipe D near the top and bottom thereof, the ends being bent for attachment to the interior of the pipe. Centrally upon each of these braces is an insulator G'. The current is designed to pass through the leading-in wire I of low resistance, which extends around the lower central insulator, and from thence to the upper central insulator through wire I' of high resistance, helically coiled. The current is thence led down through an extension of the wire I' and out through an insulated opening $d'$ and is laced up and down around the upper and lower insulators G G on the exterior of the pipe. (See Figs. 1, 3, and 4.) A continuation of said wire by another electrically connected (marked $I^2$) thence extends farther outward and is correspondingly laced around the insulators on the larger and lower portion M of the heating-frame and returns through a second insulated opening $d^2$ in the pipe D to the return-wire J of the circuit by way of a controlling-switch H. It will be understood that the wire $I^2$, as well as the wire I', is of high resistance, so as to develop heat in the required moderate degree, but in liberal quantities, under the influence of a proper current flowing from the leading-in wire I to the return-wire J. After having thus traversed inside and outside of the pipe D and raised the temperature of the whole of that tall and important member of the heating-frame the wire is extended or electrically connected to a new wire $I^3$, (see the diagram, Fig. 2,) which performs a similar service for the portion M, which though less high is so much extended laterally that it may be and ordinarily is an equally or more than equally efficient portion of the heating-frame. I will use supernumerals when necessary to distinguish the oval bands which constitute this extended lower portion M of the heating-frame, M' being the upper and $M^2$ the lower band. The wire $I^3$ is extended around insulators placed on the upper and lower bands. The relative efficiency of this as compared to the other part of the apparatus may be varied by applying more or less insulators and making a greater or less number of convolutions of the wire $I^3$. The tendency of the heated air to rise makes it practicable to warm the upper portion uniformly with the lower portion of the corset with much less heating-wire in the upper than in the lower part of the heating-frame. Experiments may determine in any given case what proportion of heating should be in the bottom and what proportion in the middle and upper portion of the heating-frame to induce the desired result on the corset, which when the apparatus is in use applies closely on the exterior of the inclosing form.

A series of the heating-frames is arranged along on the mats C conveniently in a row and their wires I connected with the feeder-circuit $I^*$ in multiple arc. To use the apparatus, the corsets are successively dampened, adjusted, and clamped upon the forms A, each form inclosing a heating-frame resting on a mat, the enlarged base of the frame occupying the hip portion. The circuit is closed, if this has not been done before. All the convolutions of the wires I' $I^2$ $I^3$ and the entire heating-frame becoming moderately heated, the copper form inclosing it becomes sufficiently heated to properly shape and finish the corsets.

Side knobs $D^3$, medially located on the heating-frame, serve to press outward against the interior of the shaping-form A at the waist to maintain the form in its proper position relatively to the frame. These are of rubber or other good non-conductor of heat. At all other points the heating-frame and the shaping-form are out of contact, and the heating is effected by radiation instead of direct conduction, and consequently the heating, though rapid, is uniformly distributed.

In a short time, usually from ten to fifteen minutes, each corset will be brought to its shape and dried. Two girls can attend about twenty-five forms. The corsets present a finer and more finished appearance than the same grade of corsets shaped and finished on steam-heated forms.

To promote correct adjustment of the dampened corsets upon each form, a short smooth knob or, more properly, pin $A^2$ is set in the front line near the top of the corset and another such smooth pin $A^3$ in the front line near the bottom. These are set each at such height as to be received in the narrow opening which extends up and down between the two halves of the corset at the front. They are adjusted to apply properly in such joint even if the style or size of corset being treated is longer or shorter than usual. I also apply reversed upper and lower spring-fingers $A^4$ $A^5$ at the points indicated in Fig. 5, each made sufficiently long and so set that they will allow for all ordinary variations in length. Each of these fingers curves and is in nearly bearing contact with the form. They not only act as gages, contributing, with the pins $A^2$ and $A^3$, or even serving fairly well without them, to insure that the corset is applied in the correct position, but may be made to exert an inward pressure at those points during the setting operation to secure great nicety of shape.

The corsets previously sewed and nearly completed and having the two halves properly clasped at the front to keep together and serve as a unit are usually slightly sponged at and near the back and wrapped around the shaping-form from the front by one attendant, while another moving correspondingly along the line of forms on the opposite side of the bench applies a temporary lacing, which engages with hooks temporarily applied on each side at the back, as set forth in the patent to me, dated January 18, 1898, No. 597,685. If the corset has been a half-size too small, the lace should be strained so as to stretch and widen the parts a little, but ordinarily it will induce the desired close fit to the form with slight force. The girl on the front side sponges the front of the corset while this is being done, and then each girl proceeds to give attention to the next form, removing the one previously on and applying a new one, and so on.

The cooling due to radiation and to the application of water in sponging the corsets is counteracted by the constant accession of caloric at a moderate temperature. The bands $M'$ $M^2$ and the heating-wire $I^3$, held thereon in a more extended form than the heating parts above, conform to the enlargement for the hips in the lower portion of the form A. Applying heat mainly in the lower portion counteracts the tendency of the confined air to be hottest at the top.

I attach importance to the provisions for electrical heating in corset-shaping for the reason, among others, that it is readily available for imparting a temperature lower than steam heat—a condition not attainable by steam except with a partial vacuum, which latter is practically unavailable for corset-shaping with a number of exchangeable forms. Hot water is objectionable, for the liability is nearly as great as with steam to leak and involve danger of soiling the delicate material, and in cold climates such apparatus, liable to be often put out of use for long periods, are likely to involve difficulties from frost. Electrical heating can give as moderate degrees and is without objection.

The soft incombustible mat C is more especially important when through any maladjustment of the electrical force, which may occur at rare intervals, a dangerously high heat is generated in the apparatus. The mat prevents its being ever communicated to the bench.

Modifications may be made without departing from the principle or sacrificing the advantages of the invention. The character and construction of the heating-frame may be widely varied, it only being essential that it shall properly support the heating-sections of the circuit in juxtaposition and with uniformity relative to the effective portions of the form. The particular disposition of the wiring set forth is not specially depended upon, it being only important that an efficient electric heat-generator be employed. Many of the resistance mediums utilized in electrical heaters for cars and other purposes may, with or without alteration, be employed.

It will be manifest that I can employ an adjusting-gage other than that presented by the fingers $A^4$ $A^5$. Additions may be made. It may be advantageous in some cases to locate spring-fingers at other points on the form. Knobs or spurs serving in the manner of the knobs $D^3$ to brace the form relative to the heating-frame can be located at points other than at the waist.

I claim as my invention—

1. A corset-shaper composed of a hollow form removably supported and inclosing a readily-separable electrical heating-frame wired with heating-conductors having the upper portion of the said heating-frame of a sufficiently small diameter to allow the waist of the form to be moved endwise freely in assembling and distributing the parts, all combined and arranged for joint operation substantially as herein specified.

2. A corset-shaper composed of a hollow form A, supported on a table B, and inclosing a readily-separable electrical heater wired with heating-conductors having the upper portion of the heating-frame of a sufficiently small diameter to allow the waist of the form to be raised and lowered at will while the lower portion practically fills the enlarged bottom of the shaping-form, all combined and arranged for joint operation substantially as herein specified.

In testimony that I claim the invention above set forth I affix my signature in presence of two witnesses.

PATRICK J. MENAHAN.

Witnesses:
I. STRAUSS,
EDWARD R. LANDERS.